US012153382B2

(12) United States Patent
Pollack

(10) Patent No.: US 12,153,382 B2
(45) Date of Patent: Nov. 26, 2024

(54) APPARATUS TO PROVIDE FOR AN ORNAMENT TO ATTACH TO A WATCH

(71) Applicant: Alex J. Pollack, Panama City Beach, FL (US)

(72) Inventor: Alex J. Pollack, Panama City Beach, FL (US)

( * ) Notice: Subject to any disclaimer, the term of this patent is extended or adjusted under 35 U.S.C. 154(b) by 586 days.

(21) Appl. No.: 17/408,731

(22) Filed: Aug. 23, 2021

(65) Prior Publication Data

US 2023/0057563 A1 Feb. 23, 2023

(51) Int. Cl.
*G04B 47/04* (2006.01)
*A44C 25/00* (2006.01)

(52) U.S. Cl.
CPC ............ *G04B 47/04* (2013.01); *A44C 25/007* (2013.01)

(58) Field of Classification Search
CPC .. G04B 47/04; G04B 37/1486; A44C 25/007; A44C 5/14; Y10T 24/4782; Y10T 24/4718
See application file for complete search history.

(56) References Cited

U.S. PATENT DOCUMENTS

| | | | | | |
|---|---|---|---|---|---|
| 2,957,216 | A | | 10/1960 | Mule | |
| 3,678,544 | A | * | 7/1972 | Bert | G04B 37/1486 D11/94 |
| 3,795,353 | A | * | 3/1974 | Weiss | G04B 37/1486 968/359 |
| 3,889,323 | A | * | 6/1975 | Reith | A44C 5/14 224/177 |
| 5,022,237 | A | | 6/1991 | Monderer et al. | |
| D509,757 | S | | 9/2005 | Mok | |
| 7,322,212 | B2 | | 1/2008 | Golove et al. | |
| D600,139 | S | | 9/2009 | Miloradovic | |
| 9,804,571 | B2 | | 10/2017 | Lee et al. | |
| 2004/0103500 | A1 | | 6/2004 | Ward | |
| 2010/0058619 | A1 | | 3/2010 | Ferrante et al. | |
| 2014/0102141 | A1 | | 4/2014 | Messiner | |

FOREIGN PATENT DOCUMENTS

| | | | | | |
|---|---|---|---|---|---|
| AT | 11372 | U1 | * | 7/2010 | A44C 5/14 |
| CN | 2293972 | Y | * | 10/1998 | |
| CN | 210605382 | U | * | 5/2020 | |
| DE | 102007011165 | | | 9/2008 | |
| EP | 3031342 | | | 6/2016 | |
| EP | 3031342 | A1 | * | 6/2016 | |

OTHER PUBLICATIONS

Charm detail round dial wristwatch with pin buckle. MaxFashion. https://www.maxfashion.com/bh/en/Girls/Accessories/MAX-Charm-Detail-Round-Dial-Wristwatch-with-Pin-Buckle/p/161454243, accessed Aug. 8, 2021.

* cited by examiner

*Primary Examiner* — Edwin A. Leon
(74) *Attorney, Agent, or Firm* — Terry M. Sanks, Esq.; Beusse Sanks, PLLC

(57) ABSTRACT

An apparatus for securing an ornament to a watch is disclosed having a first end attachable to a spring bar of a watchband and a second end extending away from the first end with an opening to receive an attachment for an ornament. A second apparatus is also disclosed.

19 Claims, 4 Drawing Sheets

APPARATUS TO PROVIDE FOR AN ORNAMENT TO ATTACH TO A WATCH

BACKGROUND

Embodiments relate to a watch and, more particularly, to an apparatus to provide an ornament attached to the watch.

People enjoy adding wearable accessories as a style choice. For example, CROC® shoes include opening on a surface through which wearers can attach pins or ornaments to personalize these shoes. Adding ornaments to bracelets, anklets and necklaces are also well-known accessories that can be personalized.

However, when considering watches, the current practice is to personalize a watch by selecting a particular watch, based in part on the watch casing, or selecting a preferred watch band.

Wearers of watches would benefit from being able to further personalize a watch by adding an accessory that is not permanent to the watch or will damage either the watch face, casing or band when removing the personalized ornament.

SUMMARY

Embodiments relate to an apparatus used to attach an ornament to a watch. The apparatus comprises a first end attachable to a spring bar of a watchband and a second end extending away from the first end with an opening to receive an attachment for an ornament.

Another apparatus comprises a sleeve component that fits around a watch band spring bar and within an opening in the watch band that fits over the spring bar. The apparatus also comprises an ornament attachment component that extends from the sleeve component, watchband spring and watchband to provide for an ornament to dangle unobstructed by a watchband and watch casing.

BRIEF DESCRIPTION OF THE DRAWINGS

A more particular description briefly stated above will be rendered by reference to specific embodiments thereof that are illustrated in the appended drawings. Understanding that these drawings depict only typical embodiments and are not therefore to be considered to be limiting of its scope, the embodiments will be described and explained with additional specificity and detail through the use of the accompanying drawings in which.

DETAILED DESCRIPTION

Figure 1:
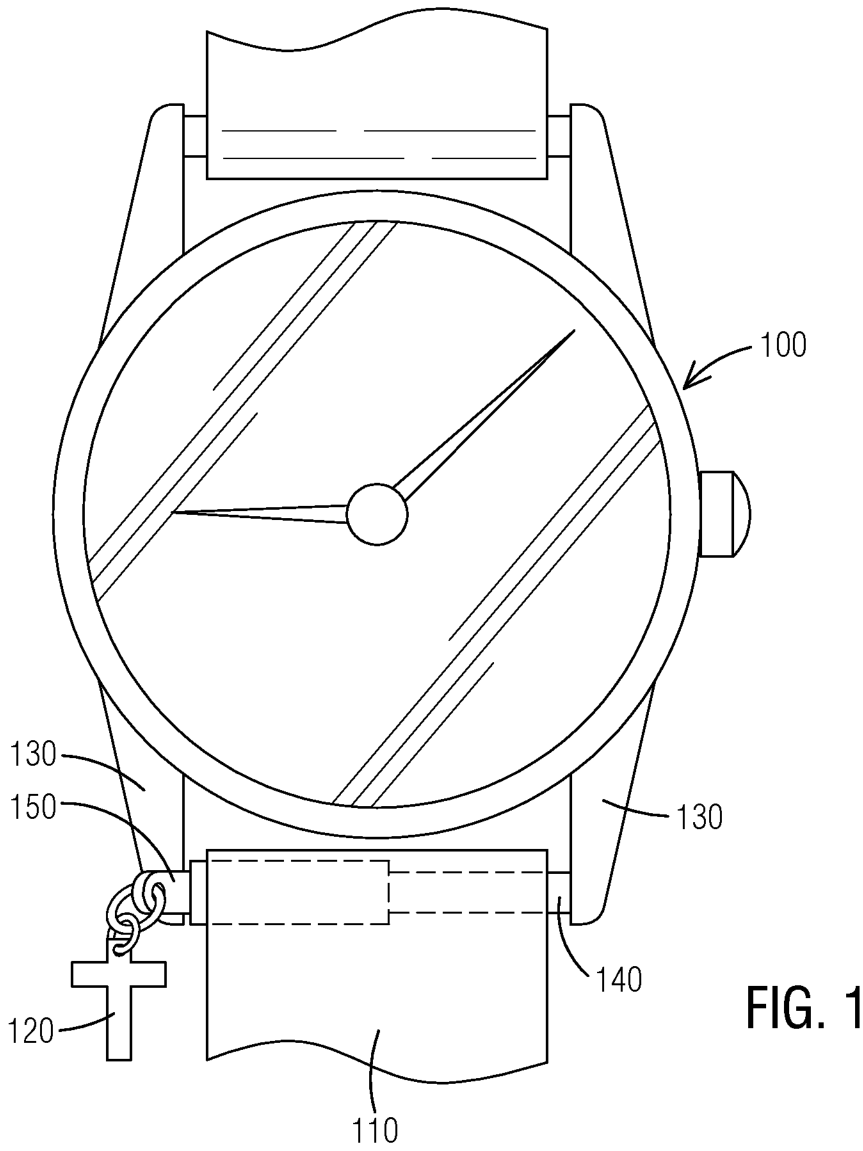
FIG. 1 shows a top view of a watch with an embodiment disclosed herein attached to the watch.

Embodiments are described herein with reference to the attached figures wherein like reference numerals are used throughout the figures to designate similar or equivalent elements. The figures are not drawn to scale and they are provided merely to illustrate aspects disclosed herein. Several disclosed aspects are described below with reference to non-limiting example applications for illustration. It should be understood that numerous specific details, relationships, and methods are set forth to provide a full understanding of the embodiments disclosed herein. One having ordinary skill in the relevant art, however, will readily recognize that the disclosed embodiments can be practiced without one or more of the specific details or with other methods. In other instances, well-known structures or operations are not shown in detail to avoid obscuring aspects disclosed herein. The embodiments are not limited by the illustrated ordering of acts or events, as some acts may occur in different orders and/or concurrently with other acts or events. Furthermore, not all illustrated acts or events are required to implement a methodology in accordance with the embodiments.

FIG. 1 shows a top view of a watch with an embodiment disclosed herein attached to the watch. Attached to a watchband 110 of the watch 100 is an ornament 120. The watch 100 also has a watch casing 130. The watchband 110 may be connected to the watch casing 130 by a spring bar 140. As an overview, the ornament 120 may be one which hangs from or dangles from the watch casing 130. An ornament attachment component 150 is provided to attach to the ornament 120 at a first end of the ornament attachment component 150. However, depending on the ornament 120, the embodiments disclosed herein may not be arranged so that the ornament 120 actually hangs or dangles, but instead may have a semi-fixed or semi-ridged placement. Whether the ornament 120 dangles or not may depend on how fixed the apparatus is with respect to the spring bar 140 and watchband 110 or on whether the ornament 120 is one which will result in a dangled arrangement.

Figure 2:
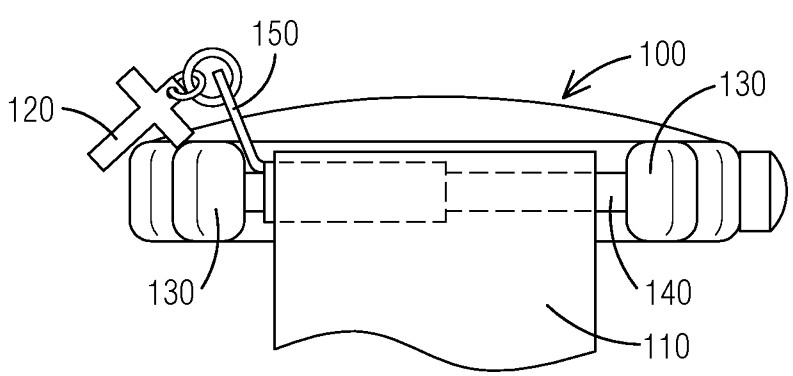
FIG. 2 shows a side view of the watch.

FIG. 2 shows a side view of the watch discussed above with respect to FIG. 1. The ornament 120 is not included. However, the ornament attachment component 150 is visible.

Figure 3A:
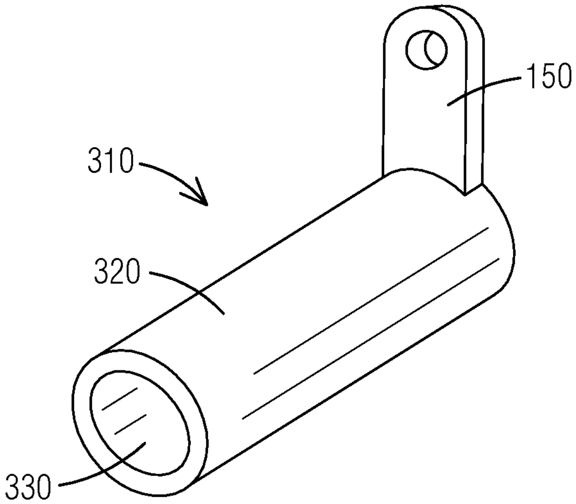
FIGS. 3A and 3B show a first embodiment disclosed herein.
Figure 3B:
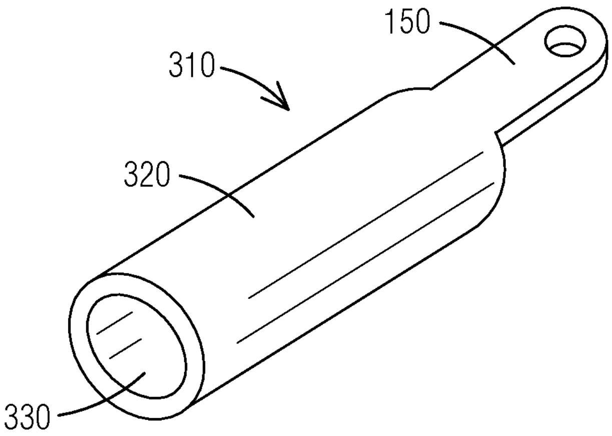

FIGS. 3A and 3B show a first embodiment disclosed herein. The ornament hanging apparatus 310 is provided. FIG. 3A, shows the ornament attachment component 150 bent to a desired angle. As those skilled in the art will recognized, the desired angle is non-limiting. FIG. 3B shows the ornament attachment component 150 prior to being bent to any desired angle. The apparatus 310 has the ornament attachment component 150 as part of the apparatus 310. In this embodiment, the attachment component 150 is located at a far, distant or first end of the apparatus 310. When considering the specific parts of the apparatus, the apparatus 310 comprises a tubular component 320, sleeve component, or cylindrical tube, where the attachment component 150 is located at a far, distant or first end of the tubular component.

The apparatus 310 may be made of a hardened plastic or metal. When made from metal, the cylindrical tube 320 may have an opening through a center 330. This center opening 330 may be pre-formed or machined out when forming the apparatus 310 is performed. The attachment component 150 may be a continuous part of the same cylindrical tube 320, but is bent such as, but not limited to, perpendicular to the length of the unbent tube. Thus, by having a continual piece of material forming both the cylindrical tube 320 and the attachment component 150, having the bent location as a single point of failure is minimized.

In another embodiment, when a plastic is used, the apparatus may be constructed with an additive manufacturing process that layers material on top of each previous layer. Similarly, an additive manufacturing process may also be used such as, but not limited to, sintering, when metal is used. Yet another additive manufacturing process may provide for each component of the apparatus, namely, the attachment component and the cylindrical tube being made of different materials such as, but not limited to, a resin, plastic, metal, etc.

A length of the cylindrical tube 320 is non-limiting. Therefore, the length may extend from a first end of the spring bar to a second end of the spring bar, or it may extend any shorter difference between an opening between the spring bar and the watch band. Thus, this length may be less than a millimeter.

Figure 4:
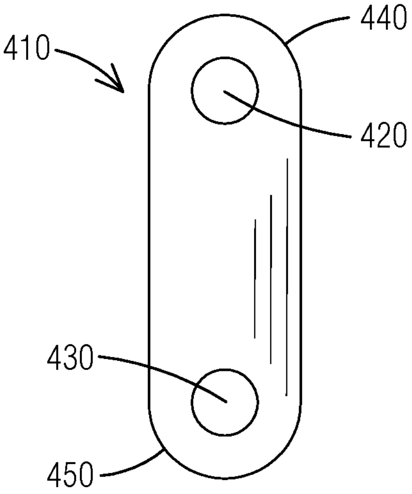
FIGS. 4-6 show various other embodiments disclosed herein.

FIGS. 4-7 show various other embodiments disclosed herein. As shown in FIG. 4, instead of a cylindrical tube, this embodiment of the apparatus 310 provides for a flat plate component 410 which has an opening 420, 430 at each end 440, 450 of the plate component 410. The opening 420, or hole, at the first end 440 may be specific to accommodate the spring pin of the watchstrap, or watchband. The opening 430 at the other end 450 may accommodate an attachment, or clasp, to the ornament 120, or the ornament 120 when the clasp or attachment, are a part of the ornament 120. Thus, these holes 420, 430 may have the same size, or diameter, or have different sizes. The plate component ends 440, 450 may be aligned in a same plane.

Figure 5:
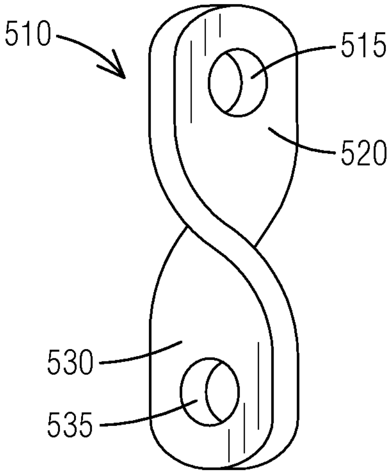

FIG. 5 shows another embodiment of the apparatus formed from a plate component. However, unlike the arrangement disclosed with respect to FIG. 4, the plate component 510 may be twisted such as, but not limited to, about ninety (90) degrees, so that each end 520, 530 of flat plate component 510 may be positioned at a 90-degree position from the other. Though 90 degrees is suggested above, the plate component 510 may be twisted, at any degree, to provide for the first end 520 and the second end 530 to be positioned in different planes from each other. As with FIG. 4, the flat plate component 510 has an opening 515, or hole, at the first end 520 and a second opening 535 at the other, or second end 530.

Figure 6:
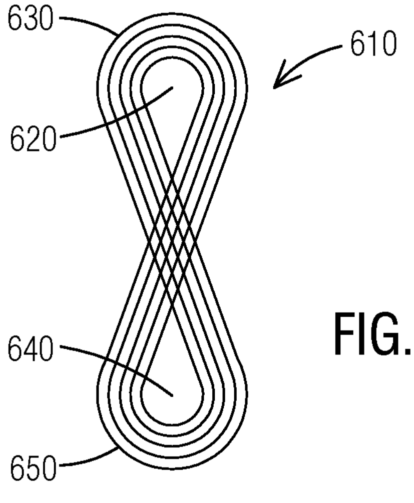

FIG. 6 shows an embodiment based on wire. In an embodiment, stranded wire may be used to form a plate-like component 610. In another embodiment, the stranded wire or each individual wire, when not stranded, may include a covering, not shown. The covering may have a color as selected by a user. Thus, the color of the covering may provide for the apparatus 310 to have a desired color based on a selection by a user. The wire may wound to leave a first hole 620 at a first end 630 and a second hole 640 at a second end 650 with diameters as disclosed above.

In another embodiment, the second hole may not be provided. Instead, an end of the wire or a single wire of the strand may extend from the second end to provide a connector for the ornament. Also, though the ornament is discussed herein as having a clasp, the clasp, or any other connector fixed to the ornament, may be a unitary part of the ornament.

If braided, the braided strand of wire may provide additional durability as it can be flexed or bent numerous times without any permanent deformation or loss of strength.

Figure 7:
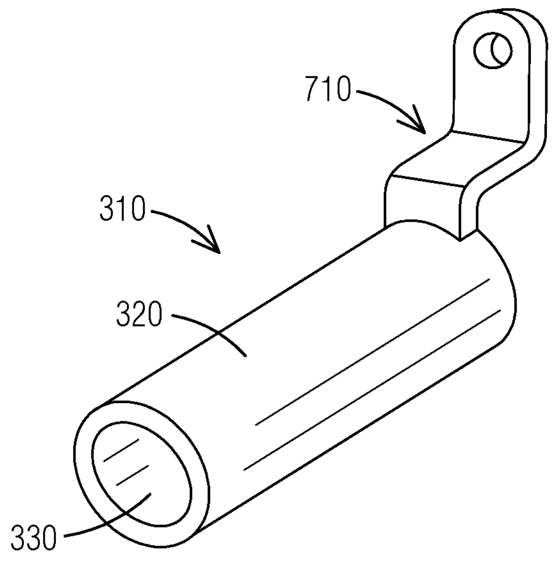
FIG. 7 shows an embodiment of an attachment to attach to the watch.

FIG. 7 shows another embodiment of having a step arrangement. As shown in further detail below, depending on the watch design, the watch band and watch casing may not provide an area for the apparatus to be attached where the apparatus is shown as being between where the spring bar engages the watch casing and the watch band. Thus, the apparatus 310 may comprise a zigzag, step or stair step arrangement 710 to accommodate providing the attachment component at an outside location from the watch case 130. More specifically, the second end of the apparatus 310 may have a step arrangement to provide for the second end to fit through an arrangement defined by the watch casing and watchband. In an embodiment, this step arrangement 710 may begin with the first end and continue with the second end.

Figure 8:
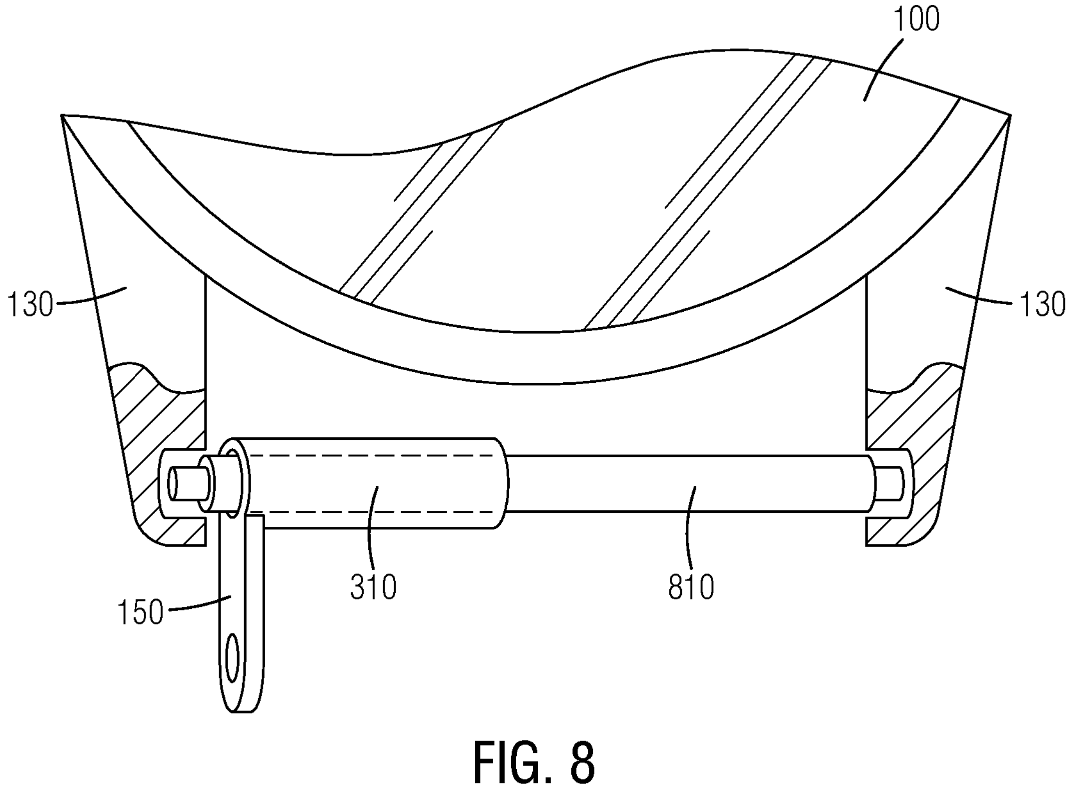
FIG. 8 shows an embodiment of how an embodiment is attached to the watch.

FIG. 8 shows an embodiment of how an embodiment is attached to the watch. The apparatus being attached is the embodiment shown in FIG. 3. As shown, FIG. 8, the tubular component 320 fits over the spring bar 810 that is used to attach a watch band to a watch component 130, or casing, having the watch face. The watch band may be inserted onto the spring bar 810, at the end that the apparatus 310 is not located. The watch band 110 may then be slid over the apparatus 310. The spring bar 810, with both the apparatus 310 as a first layer and the watch band 110 as the second layer may be fixed to the watch casing 150 through activation of the spring bar 810.

Figure 9:
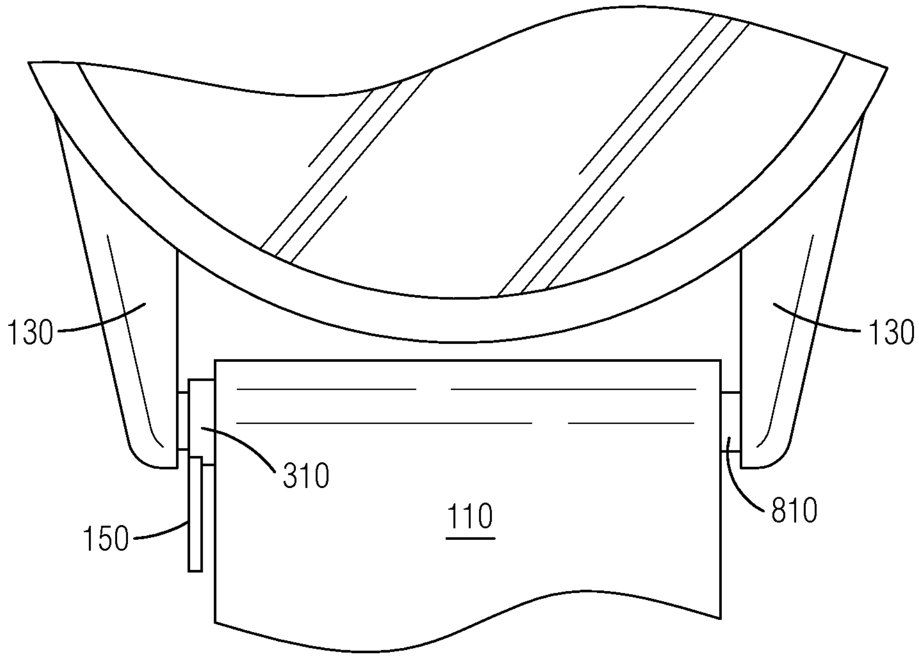
FIG. 9 shows another embodiment of how an embodiment is attached to the watch.

FIG. 9 shows another embodiment of how an embodiment is attached to the watch. As shown, when using one of the embodiments disclosed either of FIGS. 4-7, the spring bar 810 passes through the opening of the apparatus 420, 515, 620, 330 that accommodates the spring bar 810 and then the spring bar 810 is secured within the watch casing 130. The apparatus 310 does not extend within a space between the spring bar and the watch band. Instead, the second end 150, 450, 530, 650 is able to extend from both the band 110 and casing 130. In another embodiment, the second end 150, 450, 530, 650 may be bent such as, but not limited to, away from the watchband 110 to provide further clearance.

Figure 10:
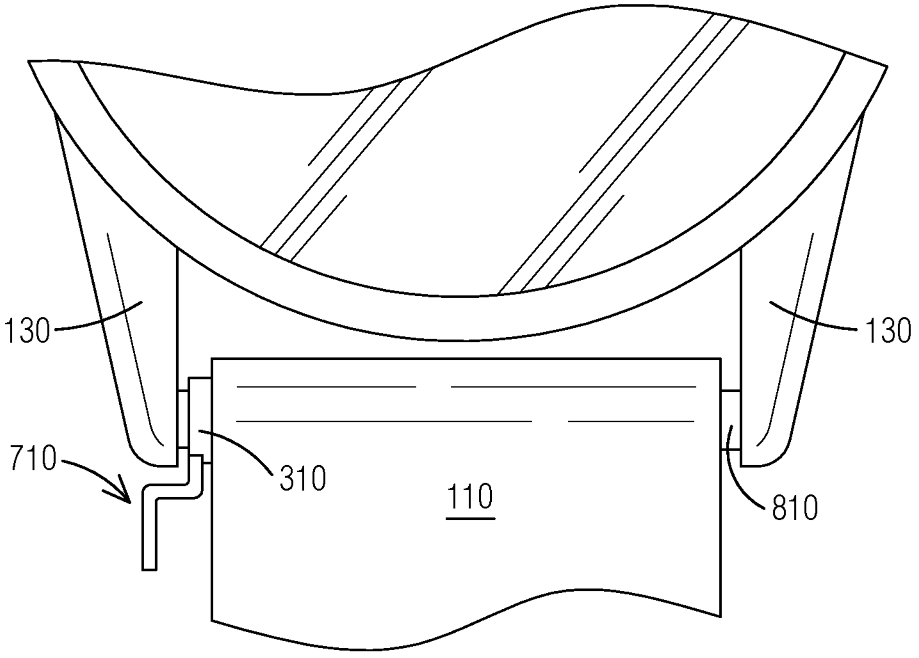
FIG. 10 shows another embodiment of how an embodiment is attached to the watch.

FIG. 10 shows another embodiment of how an embodiment is attached to the watch. In such situations, the apparatus 310 may have a stair step arrangement 710 as shown in FIG. 7 specific to the watch shown in FIG. 7. Due to the stairstep or zig-zag configuration of the apparatus 310, the attachment component 150 terminates to receive the ornament 120 on an opposite side of where the watch casing 130 engages the spring bar 810 and watch band 110. Thus, the second end or ornament attachment component may have a step arrangement to provide for the ornament attachment component to fit through an arrangement defined by the watch casing and watchband. In another embodiment, the step arrangement 710 may begin with the first end of the apparatus and continue onto the second end.

As used herein, the first end attachable to the spring bar 810 or sleeve component 320 may be recognized as the part of the apparatus that engages the spring bar. Whereas the second end extending away from the first end or ornament attachment component is recognized as the part of the apparatus where the ornament is attached.

Unless otherwise defined, all terms (including technical and scientific terms) used herein have the same meaning as commonly understood by one of ordinary skill in the art to which embodiments belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In particular, unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such data storage, transmission or display devices.

The terminology used herein is for the purpose of describing particular embodiments only and is not intended to be limiting. As used herein, the singular forms "a," "an," and "the" are intended to include the plural forms as well, unless the context clearly indicates otherwise. Furthermore, to the extent that the terms "including," "includes," "having," "has," "with," or variants thereof are used in either the detailed description and/or the claims, such terms are intended to be inclusive in a manner similar to the term "comprising." Moreover, unless specifically stated, any use of the terms first, second, etc., does not denote any order or importance, but rather the terms first, second, etc., are used to distinguish one element from another. As used herein the expression "at least one of A and B," will be understood to mean only A, only B, or both A and B.

While various disclosed embodiments have been described above, it should be understood that they have been presented by way of example only, and not limitation. Numerous changes, omissions and/or additions to the subject matter disclosed herein can be made in accordance with the embodiments disclosed herein without departing from the spirit or scope of the embodiments. Also, equivalents may be substituted for elements thereof without departing from the spirit and scope of the embodiments. In addition, while a particular feature may have been disclosed with respect to only one of several implementations, such feature may be combined with one or more other features of the other implementations as may be desired and advantageous for any given or particular application. Furthermore, many modifications may be made to adapt a particular situation or material to the teachings of the embodiments without departing from the scope thereof.

Further, the purpose of the foregoing Abstract is to enable the U.S. Patent and Trademark Office and the public generally and especially the scientists, engineers and practitioners in the relevant art(s) who are not familiar with patent or legal terms or phraseology, to determine quickly from a cursory inspection the nature and essence of this technical disclosure. The Abstract is not intended to be limiting as to the scope of the present disclosure in any way.

Therefore, the breadth and scope of the subject matter provided herein should not be limited by any of the above explicitly described embodiments. Rather, the scope of the embodiments should be defined in accordance with the following claims and their equivalents.

I claim:

1. An apparatus for securing an ornament to a watch, the apparatus comprising:

a first end comprising a first opening to receive at least a portion of a spring bar of a watchband, wherein the first opening is configured to completely surround an outer surface of the at least a portion of the spring bar, wherein the first opening comprises the only portion of the apparatus that engages the spring bar; and a second end extending away from the first end with a second opening to receive an attachment for the ornament.

2. The apparatus of claim 1, wherein the first end comprises a cylindrical tube that fits around the spring bar of the watchband and within a watchband opening that receives the spring bar.

3. The apparatus of claim 2, wherein the second end comprises the cylindrical tube of the first end having a bent arrangement to define the second end.

4. The apparatus of claim 3, wherein the cylindrical tube comprising the first end and the second end is a continuous piece of material.

5. The apparatus of claim 1, wherein the first end and the second end comprise a wire wound to provide the first opening at the first end to receive the spring bar and the second opening at the second end to receive the attachment for the ornament.

6. The apparatus of claim 5, wherein the wire comprises a wire strand.

7. The apparatus of claim 1, wherein the first end and the second end are formed in a flat plate component.

8. The apparatus of claim 7, the flat plate component is twisted to provide for the first end and the second end to be positioned in different planes from each other.

9. The apparatus of claim 8, wherein the flat plate component is twisted ninety degrees so that each flat end is positioned at a 90-degree position from an opposing flat end.

10. The apparatus of claim 1, wherein when a watch casing and watch band do not provide an opening for the second end to extend away from the watch casing, the second end comprises a step arrangement to provide for the second end to fit through an arrangement defined by the watch casing and watchband.

11. The apparatus of claim 10, wherein the step arrangement begins at the first end and continues onto the second end.

12. An apparatus, the apparatus comprising:

a sleeve component that fits around a watch band spring bar and within an opening in a watch band that fits over the spring bar, wherein the sleeve component comprises an open center portion, wherein the open center portion comprises the only portion of the apparatus that engages the spring bar; and an ornament attachment component that extends from the sleeve component, watchband spring bar, and watchband to provide for an ornament to dangle unobstructed by the watchband and a watch casing.

13. The apparatus of claim 12, wherein the sleeve component and the ornament attachment component comprise a wire wound to provide the open center portion in the sleeve component to receive the spring bar and an attachment location on the ornament attachment component to connect the ornament.

14. The apparatus of claim 13, wherein the wire comprises a wire strand.

15. The apparatus of claim 12, wherein the sleeve component and the ornament attachment component are formed in a flat plate component.

16. The apparatus of claim 15, wherein the flat plate component is twisted to provide for the sleeve component and the ornament attachment component to be positioned in different planes from each other.

17. The apparatus of claim 16, wherein the flat plate component is twisted ninety degrees so that each flat end is positioned at a 90-degree position from an opposing flat end.

18. The apparatus of claim 12, wherein when a watch casing and watch band do not provide an opening for the ornament attachment component to extend away from the watch casing, the ornament attachment component comprises a step arrangement to provide for the ornament attachment component to fit through an arrangement defined by the watch casing and watchband.

19. The apparatus of claim 18, wherein the step arrangement begins at the sleeve component and continues onto the ornament attachment component.

* * * * *